(12) United States Patent
Gonidec et al.

(10) Patent No.: US 11,866,183 B2
(45) Date of Patent: Jan. 9, 2024

(54) AIRCRAFT WITH AN OFFSET NACELLE ALIGNED WITH THE WAKE OF THE WING

(71) Applicants: Safran Nacelles, Gonfreville l'Orcher (FR); SAFRAN AIRCRAFT ENGINES, Paris (FR); INSTITUT SUPERIEUR DE L'AERONAUTIQUE ET DE L'ESPACE, Toulouse (FR)

(72) Inventors: Patrick Gonidec, Moissy Cramayel (FR); Miguel Angel Aguirre, Moissy Cramayel (FR); Nicolas Tantot, Moissy Cramayel (FR); Bruno Beutin, Moissy Cramayel (FR); Bernard Robic, Moissy Cramayel (FR); Sébastien Duplaa, Pompertuzat (FR)

(73) Assignees: Safran Nacelles, Gonfreville l'Orcher (FR); Safran Aircraft Engines, Paris (FR); INSTITUT SUPERIEUR DE L'AÉRONAUTIQUE ET DE L'ESPACE, Toulouse (FR)

( * ) Notice: Subject to any disclaimer, the term of this patent is extended or adjusted under 35 U.S.C. 154(b) by 0 days.

(21) Appl. No.: 17/721,549

(22) Filed: Apr. 15, 2022

(65) Prior Publication Data
US 2022/0242583 A1 Aug. 4, 2022

Related U.S. Application Data

(63) Continuation of application No. PCT/FR2020/051805, filed on Oct. 13, 2020.

(30) Foreign Application Priority Data

Oct. 15, 2019 (FR) .................................... 19/11467

(51) Int. Cl.
*B64D 27/20* (2006.01)
*B64D 29/04* (2006.01)
*B64D 33/04* (2006.01)

(52) U.S. Cl.
CPC ............. *B64D 27/20* (2013.01); *B64D 29/04* (2013.01); *B64D 33/04* (2013.01)

(58) Field of Classification Search
CPC ......... B64D 33/04; B64D 29/04; B64D 27/20
See application file for complete search history.

(56) References Cited

U.S. PATENT DOCUMENTS 4,500,055 A * 2/1985 Krojer .................... B64D 27/14
244/65
4,641,800 A * 2/1987 Rutan ...................... B64C 9/12
244/45 R (Continued)

FOREIGN PATENT DOCUMENTS

CA 805875 2/1969
CN 102037232 4/2011

(Continued)

OTHER PUBLICATIONS

International Search Report issued in corresponding International Application PCT/FR2020/051805, dated Jan. 29, 2021.

(Continued)

*Primary Examiner* — Tye William Abell
(74) *Attorney, Agent, or Firm* — Burris Law, PLLC

(57) ABSTRACT

An aircraft includes a fuselage carrying a nacelle of the aircraft offset relative to a wing of the aircraft. The nacelle forms an air inlet fairing of a propulsion assembly. The nacelle includes a lower wall and an upper wall delimiting together a height of the nacelle. The lower wall includes an air inlet edge being contiguous with a trailing edge of the wing.

15 Claims, 8 Drawing Sheets

(56) References Cited

U.S. PATENT DOCUMENTS

| | | | | |
|---|---|---|---|---|
| 5,957,405 | A * | 9/1999 | Williams | B64D 27/20 244/54 |
| 6,578,798 | B1 * | 6/2003 | Dizdarevic | B64C 23/069 244/35 R |
| 8,056,852 | B1 * | 11/2011 | Dizdarevic | B64C 5/02 244/45 R |
| 8,573,531 | B2 * | 11/2013 | Cazals | B64D 27/20 244/54 |
| 2004/0217234 | A1 * | 11/2004 | Jones | A61M 21/02 244/118.5 |
| 2005/0103929 | A1 | 5/2005 | Chang et al. | |
| 2007/0023571 | A1 * | 2/2007 | Kawai | F02K 1/48 244/119 |
| 2010/0163670 | A1 * | 7/2010 | Dizdarevic | B64C 39/12 244/36 |
| 2012/0043430 | A1 * | 2/2012 | Tracy | B64C 3/10 244/35 R |
| 2016/0311522 | A1 * | 10/2016 | Wiegand | B64D 27/02 |
| 2017/0096232 | A1 | 4/2017 | Suciu et al. | |
| 2017/0137137 | A1 | 5/2017 | Bordoni et al. | |
| 2018/0001999 | A1 * | 1/2018 | Page | B64C 25/14 |
| 2018/0281978 | A1 | 10/2018 | Beutin et al. | |
| 2020/0331589 | A1 * | 10/2020 | Cummings | B64C 5/02 |

FOREIGN PATENT DOCUMENTS

| | | |
|---|---|---|
| FR | 2937952 | 5/2010 |
| GB | 1157478 | 7/1969 |

OTHER PUBLICATIONS

Anonymous, GE Aviation in Co-op on VTOL Demonstration, American Machinist, Sep. 19, 2018, available at URL https://www.americanmachinist.com/news/article/21902861/ge-aviation-in-coop-on-vtol-demonstration.

Davis, Boeing to Acquire Aurora Flight Sciences, and Autonomous Flight Technology Pioneer, Power Electronics, Oct. 26, 2017, available at URL https://www.electronicdesign.com/news/article/21199449/boeing-to-acquire-aurora-flight-sciences-an-autonomous-flight-technology-pioneer.

Anonymous, Lilium's 36-Engine Air Taxi Completes First Test Flight, TransportUP, May 18, 2019, available at URL https://transportup.com/headlines-breaking-news/vehicles-manufactures/liliums-36-engine-air-taxi-completes-first-test-flight/.

* cited by examiner

AIRCRAFT WITH AN OFFSET NACELLE ALIGNED WITH THE WAKE OF THE WING

CROSS-REFERENCE TO RELATED APPLICATIONS

This application is a continuation of International Application No. PCT/FR2020/051805, filed on Oct. 13, 2020, which claims priority to and the benefit of FR 19/11467 filed on Oct. 15, 2019. The disclosures of the above applications are incorporated herein by reference.

FIELD

The present disclosure relates to the general field of aircraft propelled by dual-flow turbojet engines.

BACKGROUND

The statements in this section merely provide background information related to the present disclosure and may not constitute prior art.

Aircraft are generally equipped with turbojet engines mounted in nacelles carried by the wings of the aircraft or integrated in the rear position of a wing or of the fuselage of the aircraft and may be fastened thereon by means of pylons.

A positioning of the turbojet engines under the wings of the aircraft has the drawback of limiting the dimensioning of the nacelles due to ground clearance requirements.

Moreover, the friction effect of the air flow on the wings of the aircraft is, in flight, manifested by the boundary layer. When a nacelle is structurally integrated into the wing of an aircraft, it will be understood that the nacelle and the wing are then in mechanical and aerodynamic dependence from each other. Due to this dependence, a portion of the nacelle is comprised in the boundary layer of this wing, thus increasing the aerodynamic drag of the aircraft and generating distortions at the level of the air inlet of the nacelle and vibrations at the level of the motor shafts.

Manufacturers are therefore seeking to reduce these distortions as well as the aerodynamic drag of the aircraft. One of the ways that could be considered to achieve this is to at least partially embed the engines inside the fuselage of the aircraft to eliminate the pylons and the engine fairings, which decreases the mass of the propulsion assembly and reduces the aerodynamic drag of the aircraft wings.

The document FR 2 937 952 A1, which describes an aircraft architecture equipped with engines whose nacelles are partially semi-buried laterally in the rear portion along the fuselage, is known.

The document US 2017/096232 A1, which describes an aircraft architecture equipped with engines whose nacelles are partially semi-buried in the fuselage above the tail of the aircraft, is also known.

SUMMARY

This section provides a general summary of the disclosure and is not a comprehensive disclosure of its full scope or all of its features.

The present disclosure provides an improved aircraft architecture with reduced aerodynamic drag and easy integration into an existing aircraft architecture.

The present disclosure also provides an aircraft comprising a fuselage carrying a nacelle of the aircraft offset relative to a wing of the aircraft. The nacelle forms an air inlet fairing of a propulsion assembly and includes a lower wall and an upper wall delimiting together the height of the nacelle. The air inlet edge of the lower wall of the nacelle is contiguous with a trailing edge of the wing.

The aerodynamic positioning of the air inlet edge of the lower wall of the nacelle and of the trailing edge of the wing makes it possible to limit the aerodynamic drag of the wing while limiting distortions at the level of the propulsion assembly. The lift of the wing is then improved.

By "propulsion assembly" it should be understood an assembly comprising at least one nacelle and one engine of the turbojet type.

Moreover, this particular positioning makes it possible to provide, by means of the air flow speed differential between the upper surface and the lower surface of the wing, the aerodynamic lift of the nacelle thus greatly compensating for the mass of the propulsion assembly.

By "contiguous" it should be understood the fact that the air inlet edge of the lower wall of the nacelle is aligned with the wake of the wing by providing a space for the flow of the boundary layer of the wing between its trailing edge and the air inlet edge of the lower wall of the nacelle.

More particularly, the term "contiguous" may advantageously be quantified by a predetermined vertical interval as being the difference in the vertical distance between the air inlet edge of the lower wall of the nacelle and the trailing edge of the wing divided by the average aerodynamic chord of the wing. This predetermined vertical interval is advantageously comprised between 0.05 and 0.2.

By "vertical" it should be understood a distance measured vertically when an aircraft has a zero angle of inclination.

Similarly, the term "contiguous" may advantageously be quantified by a predetermined horizontal interval as being the difference in the horizontal distance between the air inlet edge of the lower wall of the nacelle and the trailing edge of the wing divided by the average aerodynamic chord of the wing. This predetermined vertical interval is advantageously comprised between 0.05 and 0.2.

By "horizontal" it should be understood a distance measured horizontally when an aircraft has a zero angle of inclination.

According to one form, the nacelle extends laterally from the fuselage of the aircraft in an oblong rectangular shape.

According to another form, the propulsion assembly comprises a plurality of fans.

According to yet another form, the nacelle includes partitions separating the fans. Advantageously, the partitions are oriented perpendicular to the lower wall of the nacelle.

According to one form, the air inlet edge of the lower wall is downstream of the upper surface of the wing while being parallel to its trailing edge. It will be understood that the lower wall is positioned to be swept by the wake of the wing yet without the boundary layer of the upper surface passing above the wall and penetrating into the propulsion assembly of the nacelle.

According to another form, the nacelle is mechanically connected to the wing by at least one pylon.

According to yet another form, the propulsion assembly is formed of gas turbines powered by a gas generator, each gas turbine being associated with a fan.

According to one form, the gas generator is integrated into the nacelle. Advantageously, the gas generator is directly coupled to one of the fans of the propulsion assembly.

According to another form, the gas generator is carried by the lower surface of the wing.

According to yet another form, the gas generator is carried directly by the fuselage of the aircraft.

According to one form, the gas generator is located in place of a nacelle supported by a mast of the aircraft upstream of the wing.

According to another form, when the gas generator is offset from the nacelle, the pylon is configured to allow the passage of the gas supply conduits of the gas turbines.

According to yet another form, outlet nozzles of the gas turbines have a Y shape for the passage of the gas supply conduits of each of the gas turbines.

According to one form, a distribution duct is configured to envelop each of the gas supply conduits extending along the nacelle.

According to another form, the distribution duct is composed of a skeleton carrying the gas turbines.

According to yet another form, the propulsion assembly comprises electrically or hydraulically powered motors. When a power source of these electrically or hydraulically powered motors is offset from the nacelle, the pylon is configured to allow the passage of the supply conduits of these motors. The distribution duct as previously described may envelop each of the supply conduits of these motors.

According to one form, the propulsion assembly is formed of electric turbines powered by an electric generator, each electric turbine being associated with a fan.

According to another form, the propulsion assembly is formed of hydraulic turbines powered by a hydraulic generator, each hydraulic turbine being associated with a fan.

According to yet another form, the propulsion assembly is formed of mechanical transmission turbines powered by a mechanical transmission generator, each mechanical transmission turbine being associated with a fan.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
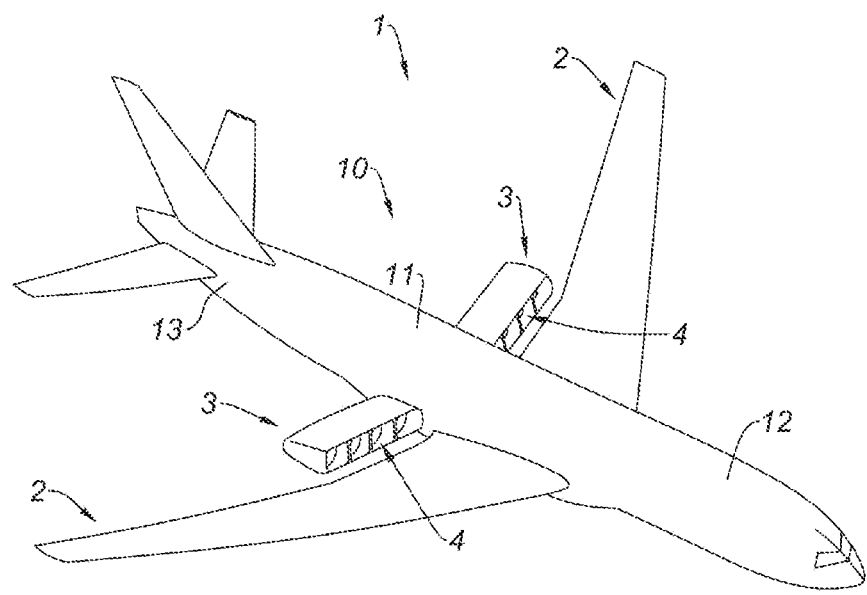
FIG. 1 is a schematic view of an aircraft according to the principles of the present disclosure including a fuselage which carries nacelles offset from the wings, each nacelle carrying a propulsion assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
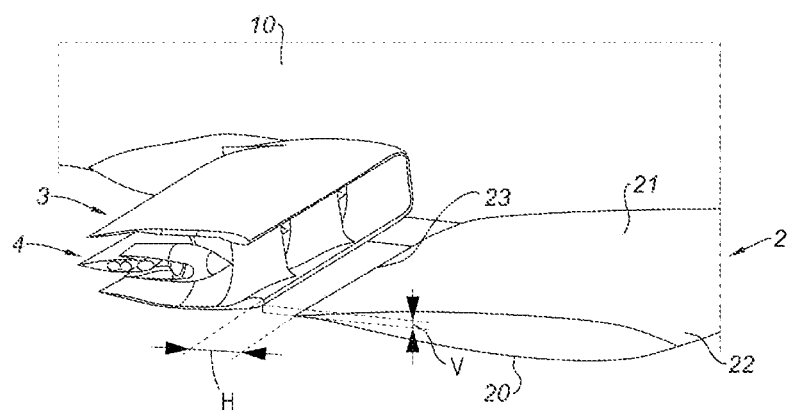
FIG. 2 is a schematic sectional view of an enlarged section of FIG. 1, illustrating the aerodynamic positioning of a nacelle relative to a wing of the aircraft.

In FIGS. 1 and 2, there is represented an aircraft 1 according to the present disclosure comprising a fuselage 10 of which is formed of a central box 11 delimiting a front portion 12 of a nose cone of the fuselage 10 and a rear portion 13 of a tail cone of the fuselage 10.

The fuselage 10 of the aircraft 1 carries, on the one hand, the wings 2 of the aircraft 1 and, on the other hand, the nacelles 3 of the aircraft 1. The nacelles 3 are therefore separated from the wings 2 by being offset therefrom and entirely carried by the fuselage 10 of the aircraft 1.

Figure 3:
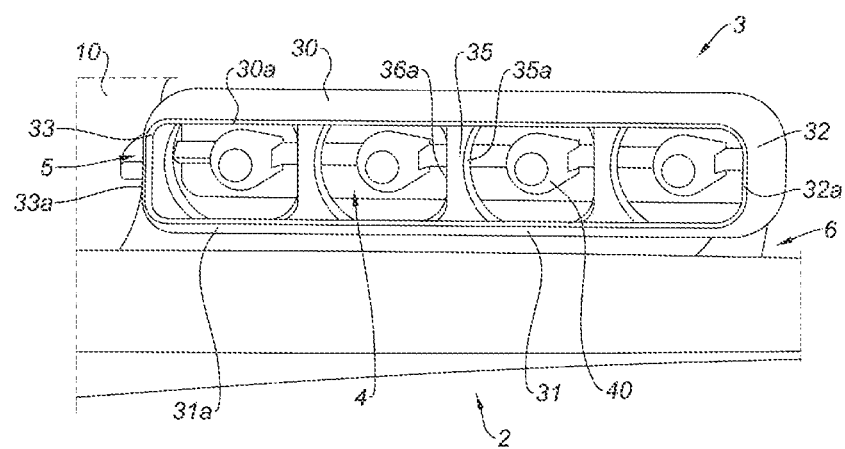
FIG. 3 is a front view of a nacelle connected by a pylon to a wing of the aircraft according to the teachings of the present disclosure.

As represented in FIG. 3, each nacelle 3 forms an air inlet fairing of a propulsion assembly. More particularly, each nacelle 3 includes an upper wall 30 and a lower wall 31 delimiting the height of the nacelle 3. Moreover, each nacelle 3 includes two side walls 32, 33 delimiting between them the width of the nacelle 3. The upper and lower walls 30, 31 with the side walls 32, 33 constitute together the air inlet fairing which takes an oblong rectangular shape.

Advantageously, the measurement between the side walls 32, 33 divided by the measurement between the upper and lower walls 30, 31 is comprised between 2 and 12.

The air inlet edges 30a, 31a, 32a, 33a of the walls 30-33 form together an air inlet lip of the air inlet fairing.

It should be understood by "oblong shape of the nacelles 3" that the walls 30-33 of the nacelle 3 extend towards the rear of the aircraft 1 from the air inlet lip.

Each wing 2 comprises a lower surface 20 and an upper surface 21 delimiting a leading edge 22 and a trailing edge 23 of the wing 2.

According to a particular positioning, the air inlet edge 31a of the lower wall 31 of a nacelle 3 is contiguous with the trailing edge 23 of the associated wing 2 while facing the upper surface 21 of the wing 2.

In addition to the reduction of the aerodynamic drag of the wing 2 due to a nacelle 3 offset from the latter, this particular positioning of the nacelle 3 with respect to the wing 2 makes it possible to substantially compensate for the mass of the propulsion assembly 4 by the lift of the nacelle 3 enabled by this aerodynamic positioning.

Indeed, in flight, a predetermined vertical V and horizontal H interval between the trailing edge 23 of the wing 2 and the lower portion of the nacelle 3, enables the passage of the wake of the wing below the nacelle 3 creating a slowdown area. This predetermined vertical V and horizontal H interval corresponds respectively to the difference in the vertical and horizontal distance between the air inlet edge 31a of the lower wall 31 of the nacelle 3 and the trailing edge 23 of the wing 2 divided by the mean aerodynamic chord of the wing 2. The vertical V and horizontal H interval is advantageously comprised between 0.02 and 0.2. The vertical V and horizontal H intervals may advantageously be of numerical values different from each other according to the configuration of the aircraft 2.

Figure 8:
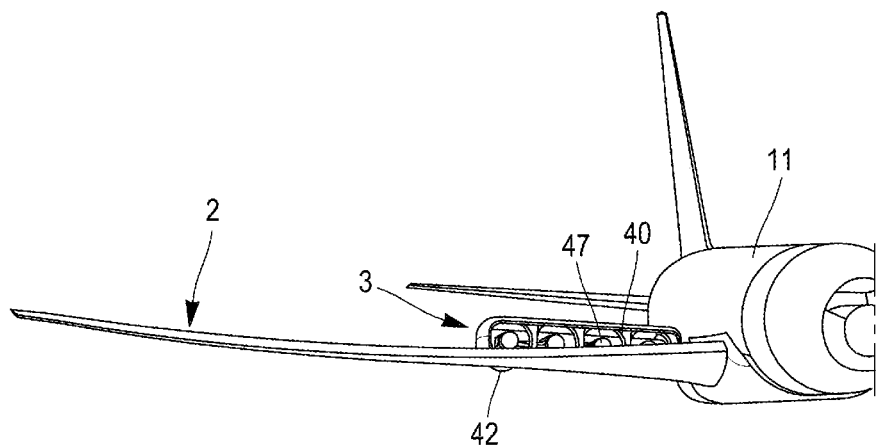
FIG. 8 is a schematic view of an aircraft in which a gas generator is positioned behind a fan replacing a gas turbine.
Figure 10:
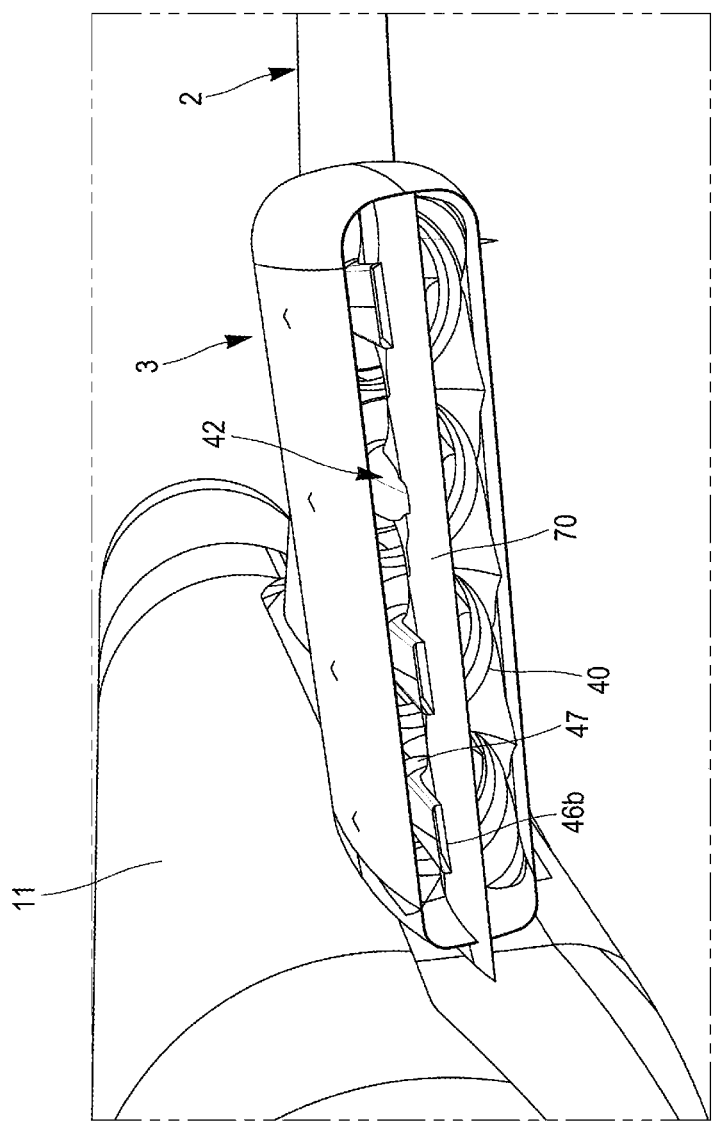
FIG. 10 is a rear view of the gas generator FIG. 9 where the nacelle is equipped with a distribution duct.

It should be noted that although the air inlet edge 31a of the lower wall 31 of the nacelle 3 is represented as being parallel to the trailing edge 23 of the wing 2, the vertical and/or horizontal interval between the air inlet edge 31a of the lower wall 31 of the nacelle 3 and the trailing edge 23 of the wing 2 may advantageously vary along their length while remaining comprised between 0.02 and 0.2, as it is represented in FIG. 8 or 10.

The air flowing out of the wake appears at the upper wall 30 faster than at the lower wall 31. This generates a depression at the level of the upper wall 30 and a slowing overpressure at the level of the lower wall 31, hence a lift of the nacelle 3. Advantageously, it is possible to choose a supercritical profile for the lower wall 30 in order to improve the lift in transonic coasting flight.

The propulsion assembly 4 comprises a plurality of fans 40 extending adjacent to each other along the length of the nacelle 3.

As represented in FIG. 3, a pylon 5 mechanically connects the air inlet fairing with oblong rectangular shape to the fuselage 10 of the aircraft 1.

An additional pylon 6 mechanically connects the nacelle 3 to the wing 2, this is for improving the mechanical holding of the nacelle and reducing the loads introduced at the interface with the fuselage.

Depending on the desired purpose, the pylon 5 may be replaced by at least one second pylon similar to the additional pylon 6 connecting the side wall 33 of the nacelle 3 to the wing 2 in the vicinity of its root. As does the attachment to the fuselage, the second pylon allows a better load distribution on the nacelle 3 in the light of its extent. These variants with or without a second pylon allow a better distribution of the aircraft thrust on the wing 2 which is, in conventional pylons, only transmitted to the wing at a single point of its extent.

The additional pylon 6 may advantageously be configured to allow the power supply of the propulsion assembly 4. For this purpose, the pylon is advantageously of hollow section in order to enable the passage of gas supply conduits 41 of the propulsion assembly 4.

Partitions 35 separating the fans 40 are provided to enable the channeling of an air flow for each fan 40. These partitions 35 are oriented perpendicular to the lower wall 31. Each partition 35 has a concave face 35a and a convex face 36a extending between the lower wall 31 and the upper wall 30 of the nacelle 3 such that each fan 40 is engaged horizontally between the faces 35a, 36a of the partitions 35 and vertically between the upper wall 30 and the lower wall 31 of the nacelle 3.

Figure 4:
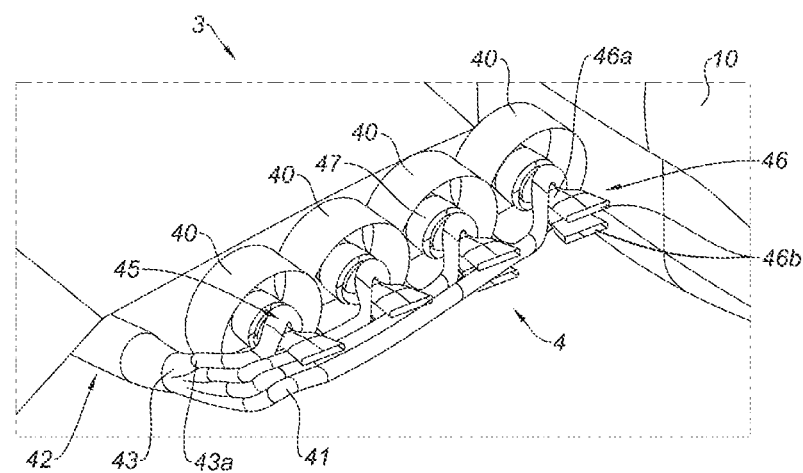
FIG. 4 is a perspective view of an alternate nacelle comprising a propulsion assembly formed of gas turbines powered by a gas generator integrated into the nacelle, each gas turbine being associated with a fan, according to the teachings of the present disclosure.

According to the form illustrated in FIG. 4, the propulsion assembly 4 is formed by gas turbines 47 powered by a gas generator 42. Each gas turbine 47 being associated with a fan 40.

The outlet conduit 43 of the gas generator 42 includes a plurality of branches 43a to which the gas supply conduits 41 of the gas turbines 47 are connected. The gas supply conduits 41 extend through the length of the nacelle 3 from the gas generator 42 in order to power each of the gas turbines 47 forming, with the fans 40, the propulsion assembly 4 carried by the nacelle 3.

The gas turbines 47 are preferably radial-inflow turbines.

The gas turbines 47 are represented herein by their gas inlet 45 and outlet nozzles 46. The inlet 45 has a U shape seeking the radial inlet of the gas turbines 47 and the outlet nozzles 46 of which have a Y shape so as to receive via a main branch 46a, the exhaust gases from the gas turbines 47 and to evacuate these exhaust gases via secondary branches 46b.

The outlet nozzles 46 allow the support and the distribution along the nacelle 3 of the gas supply conduits 41 of the turbines between these secondary branches 46b of the outlet nozzles 46.

According to a first variant illustrated in FIG. 4, the gas generator 42 is integrated into the nacelle 3. The gas generator 42 is arranged in the air inlet fairing while being carried by the lower wall 31 of the nacelle 3.

Figure 5:
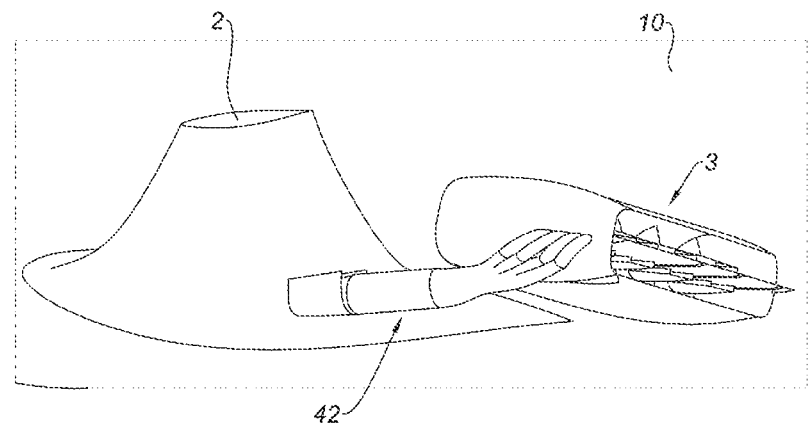
FIG. 5 is a perspective view of a gas generator offset from a nacelle and fastened to the lower surface of the wing.

According to a second variant illustrated in FIG. 5, the gas generator 42 is carried by the lower surface 20 of the wing 2. In this second variant, the additional pylon 6 has been removed in order to better illustrate the routing of the gas supply conduits 41 from the offset gas generator 42 to the gas turbines 47 of the propulsion assembly 4 of the nacelle 3.

According to a third variant which is (not illustrated), the gas generator 42 may be carried directly by the fuselage 10 of the aircraft 1. In one form, the gas generator 42 is carried by the soft belly 14 of the fuselage 10 of the aircraft 1.

In all the forms including gas generators 42 and gas turbines 47 distributed, as described above, a pipe (not represented) may advantageously connect the two gas generators 42. The pipe makes it possible to power, in the event of malfunction of one of the gas generators 42, the remaining gas turbines 47 in a degraded but uniform manner. The pipe could be open permanently or only in the event of malfunction of one of the gas generators 42. The aerodynamic integration configuration makes it possible to reduce the effects of the malfunction of propulsion on one side of the aircraft related in particular to the malfunction of a gas generator 42. The pipe reinforces the resistance to malfunction of the gas generator 42 of configuration where the aircraft would be extremely sensitive to even a minimal loss of lift on one of these sides, for example in the case of undersized roll-control surfaces.

Figure 6:
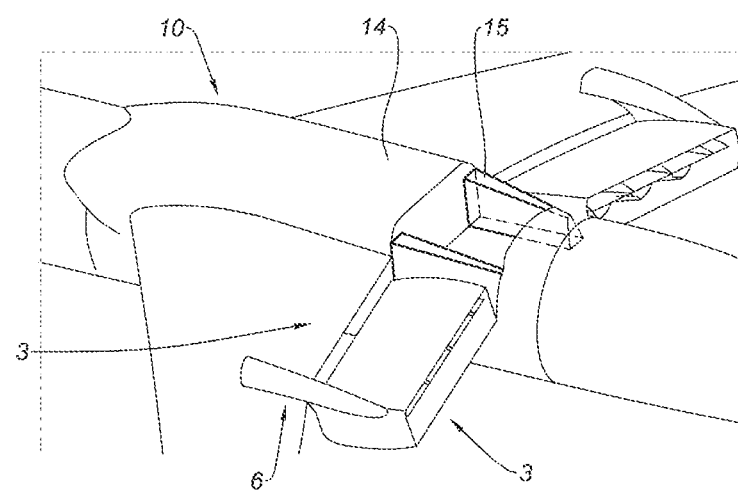
FIG. 6 is a top perspective view of the aircraft of FIG. 1 where skin of the aircraft is open to better illustrate a skeleton carrying the nacelle.

As represented in FIG. 6, the nacelle 3 is connected to the fuselage 10 downstream of a landing gear well 15 of the aircraft 1.

Figure 7:
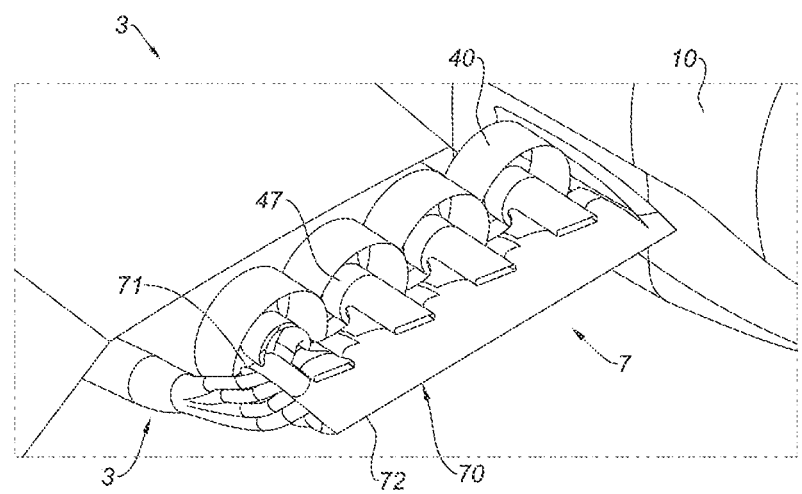
FIG. 7 is a perspective view of the gas turbines of FIG. 4 where gas supply conduits of the gas turbines are distributed by a distribution duct.

In FIG. 7, there is represented the nacelle 3 seen from the rear side. A distribution duct 70 is configured to envelop the gas supply conduits 41. This distribution duct allows the holding and the protection of these conduits 41.

The distribution duct 70 is characterized by an outer geometric envelope conforming an aerodynamic profile delimited between a leading edge 71 and a trailing edge 72. Such an aerodynamic profile contributes to the improvement of the lift of the nacelle 3.

Moreover, as represented, the distribution duct 70 is secured to the fuselage 10 of the aircraft 1 in conjunction with the nacelle 3 and forms a skeleton 7 carrying the gas turbines 47 of the propulsion assembly 4. More particularly, the skeleton 7 carries the stators of the gas turbines 47 by means of the distribution duct 70. Such a skeleton 7 carrying the gas turbines 47 limits the phenomena of vibrations at the level of the shafts of the motors.

The skeleton 7 carrying the gas turbines 47 may be secured, for example as well as the nacelle 3, to the landing gear well.

Figure 9:
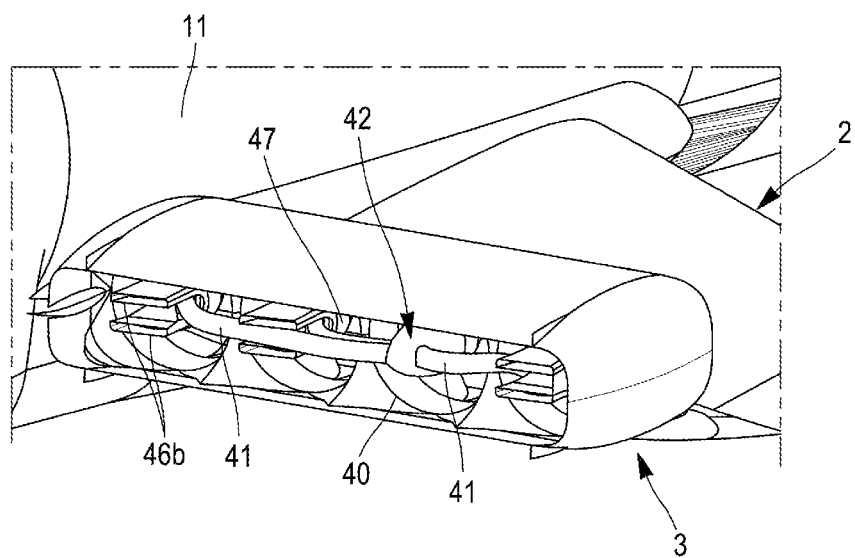
FIG. 9 is a rear view of the gas generator of FIG. 8.

FIGS. 8, 9 and 10 illustrate an integration mode where at least one gas generator 42 is located in the nacelle 3 behind one of the fans 40, that is to say replacing one of the gas turbines 47, herein the one in the third position starting from the aircraft fuselage. In this case, the conduits 41 start from this gas generator 42 to power the other three gas turbines 47 also passing through the distribution duct 70, represented in FIG. 10.

It should be noted that this configuration with integrated gas generator 42 is also applicable to electric, hydraulic generators or to a mechanical transmission, such as for example a flexible shaft. If required by the variations, the term "gas generator" could be replaced by the term "electric generator", "hydraulic generator" or even "mechanical transmission generator". The positioning of the generators according to the variant chosen may advantageously be identical to that of a gas generator. In the same way, at least one pylon 5, 6 may be used to power the electric, hydraulic or mechanical transmission turbines or else for the mechanical holding of the nacelle.

Depending on the desired purpose and the bypass ratio of the turbofans 40, 47, each formed of a gas turbine 47 and a fan 40, thus coupled to the gas generators 42, a plurality of gas generators 42 may be integrated to the nacelle 3.

Thus, the integration of four independent turbofans 40, 47 advantageously of very high bypass ratio but of smaller diameter into the aircraft in this way could also be considered.

Figure 11:
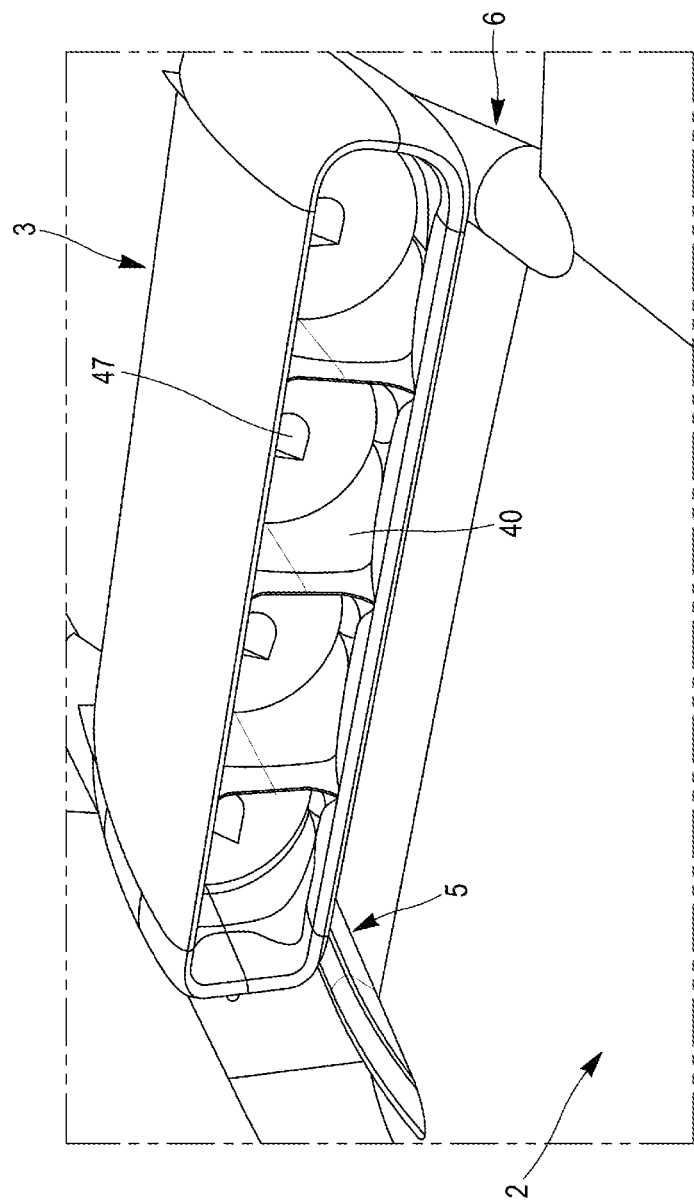
FIG. 11 is a perspective view of a nacelle mechanically connected by a pylon and by an additional pylon according to the teachings of the present disclosure.
Figure 12:
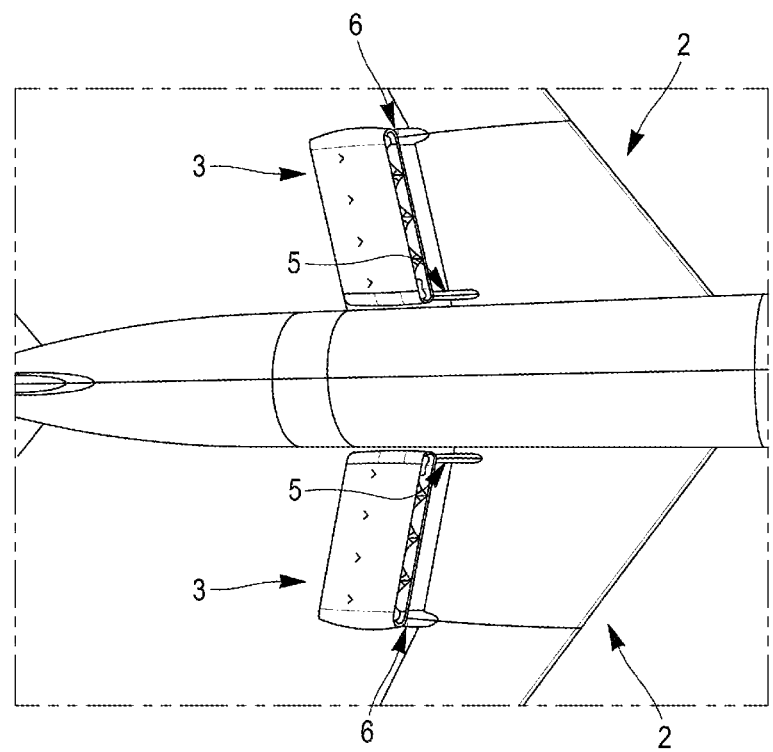
FIG. 12 is a top view of the nacelle represented in FIG. 11.

FIGS. 11 and 12 represent a form where the nacelle is no longer directly connected to the fuselage but is connected to the root of the wing 2 by an additional pylon 6 as previously described and is complementary to the pylon 5 as previously described. This form allows the direct integration on a wing when a fuselage does not offer an appropriate structural interface immediately downstream of the trailing edge of the wing.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft comprising;
a nacelle; and
a fuselage carrying the nacelle that is offset relative to a wing of the aircraft,
wherein the nacelle forms an air inlet fairing of a propulsion assembly, and includes a lower wall and an upper wall delimiting together a height of the nacelle, the lower wall comprising an air inlet edge being contiguous with a trailing edge of the wing such that the air inlet edge of the lower wall of the nacelle is aligned with a wake of the wing by providing a space for a flow of a boundary layer of the wing between the trailing edge of the wing and the air inlet edge of the lower wall of the nacelle.

2. The aircraft according to claim 1, wherein the nacelle extends laterally from the fuselage of the aircraft in an oblong rectangular shape.

3. The aircraft according to claim 1, wherein the air inlet edge of the lower wall is downstream of an upper surface of the wing while being parallel to the trailing edge of the wing.

4. The aircraft according to claim 1, wherein the propulsion assembly is formed of mechanical transmission turbines powered by a mechanical transmission generator, each mechanical transmission turbine being associated with a fan.

5. The aircraft according to claim 1, wherein the propulsion assembly comprises a plurality of fans.

6. The aircraft according to claim 5, wherein the nacelle comprises partitions of the fans.

7. The aircraft according to claim 1, wherein the nacelle is mechanically connected to the wing by at least one pylon.

8. The aircraft according to claim 7, wherein the propulsion assembly is formed of gas turbines powered by a gas generator, each gas turbine being associated with a fan.

9. The aircraft according to claim 8, wherein the at least one pylon is configured to allow the passage of a gas supply conduit of the gas turbines.

10. The aircraft according to claim 8, wherein the gas generator is integrated into the nacelle.

11. The aircraft according to claim 8, wherein the gas generator is directly coupled to one of the fans of the propulsion assembly.

12. The aircraft according to claim 8, wherein the gas generator is carried by the lower surface of the wing.

13. The aircraft according to claim 8, wherein the gas generator is carried directly by the fuselage of the aircraft.

14. The aircraft according to claim 8, wherein outlet nozzles of the gas turbines have a Y shape for the passage of gas supply conduits of each of the gas turbines.

15. The aircraft according to claim 14, further comprising a distribution duct configured to envelop each of the gas supply conduits extending along the nacelle.

* * * * *